US006292469B1

United States Patent
Darcie et al.

(10) Patent No.: US 6,292,469 B1
(45) Date of Patent: *Sep. 18, 2001

(54) APPARATUS AND METHOD TO MONITOR COMMUNICATION SYSTEM STATUS

(75) Inventors: Thomas Edward Darcie; Alan H. Gnauck, both of Middletown; Xiaolin Lu, Matawan, all of NJ (US)

(73) Assignee: AT&T Corporation, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/657,292

(22) Filed: Sep. 7, 2000

Related U.S. Application Data

(63) Continuation of application No. 08/908,498, filed on Aug. 7, 1997, now Pat. No. 6,137,780.

(51) Int. Cl.⁷ .............................. G06F 11/00; H04B 7/212
(52) U.S. Cl. ...................... 370/248; 370/441; 370/479; 340/522
(58) Field of Search ............................. 370/248, 251, 370/441, 442, 479, 465, 522, 480, 498; 340/457.1, 522, 523, 870.09

(56) References Cited

U.S. PATENT DOCUMENTS

| | | | |
|---|---|---|---|
| 3,909,720 | 9/1975 | Fantera | 370/242 |
| 3,920,973 | 11/1975 | Avellar et al. | 375/224 |
| 3,935,470 | 1/1976 | Cake | 340/522 |
| 4,195,206 | * 3/1980 | Baichtal | 370/248 |
| 4,558,319 | 12/1975 | Shum | 340/870.09 |
| 4,601,028 | 7/1986 | Huffman et al. | 370/248 |
| 5,373,504 | * 12/1994 | Tanaka et al. | 370/522 |
| 5,499,241 | 3/1996 | Thompson et al. | 370/522 |
| 5,500,758 | 3/1996 | Thompson et al. | 359/189 |
| 5,528,582 | 6/1996 | Bodeep et al. | 370/465 |
| 5,719,867 | 2/1998 | Borazjani | 370/442 |
| 6,137,780 | * 10/2000 | Darcie et al. | 370/248 |

FOREIGN PATENT DOCUMENTS

| | | |
|---|---|---|
| 0420230A2 | 3/1991 | (DE). |
| 4-222125 AJ | 8/1992 | (JP). |

OTHER PUBLICATIONS

Digital and Analog Communication Systems, by K. Sam Shanmugam, pp. 301–304, 1979.

* cited by examiner

*Primary Examiner*—Alpus H. Hsu
*Assistant Examiner*—Afsar M Qureshi
(74) *Attorney, Agent, or Firm*—Oliff & Berridge, PLC

(57) ABSTRACT

A monitoring apparatus and method are provided for a communication system in which a central office communicates to at least one end unit using intermediate remote nodes. The remote node receives signals from both the central office and the end units. Each remote node can be equipped with apparatus for monitoring the integrity of paths of the communication system. The monitoring apparatus can include a mixing device that mixes received signals to produce combined signals. The received signals generally include a pilot signal sent from the central office and a data signal sent from the at least one end unit. The state of the communication system is analyzed based on the combined signals. If the combined signals includes only the data signal from the end unit, the path through which the pilot signal was sent is inoperative. If the combined signals includes only the pilot signal, the transmission path from the end unit over which the data signal is sent is inoperative. If the combined signals are not received at the central office after transmission of the pilot signal, a determination is made that any part of transmission path could be inoperative.

17 Claims, 1 Drawing Sheet

APPARATUS AND METHOD TO MONITOR COMMUNICATION SYSTEM STATUS

This is a Continuation of U.S. application Ser. No. 08/908,498 filed Aug. 7, 1997, now U.S. Pat. No. 6,137,780. The entire disclosure of the prior application(s) is hereby incorporated by reference herein in its entirety.

FIELD OF THE INVENTION

This invention relates to broadband communications and, more particularly, to a system for monitoring communication paths within a communication network.

BACKGROUND OF RELATED ART

One type of communications network consists of a central office (CO) transmitting signals to and receiving signals from a plurality of end units (EUs) through a plurality of remote nodes (RNs). Each RN is connected to a subset of the plurality of EUs.

However, communication technology is needed in which the integrity of all transmission paths and remote active components can be successfully monitored, enabling a system user or operator to detect difficulties within the communication network.

SUMMARY OF THE INVENTION

It is an object of the present invention to provide a communication system monitoring method and apparatus that solves at least the problems above.

It is another object of the present invention to provide a communication system monitoring method and apparatus that monitor communication trunks, distribution paths and remote nodes of a communication system from one location.

It is yet another object to provide a method and apparatus for monitoring a communication system that includes receiving first and second communication signals over first and second transmission paths, respectively, mixing the received signals to create combined signals based on the first and second communication signals, and analyzing a state of the communication system based on the combined signals.

In one embodiment, a CO transmits communication signals to and receives communication signals from a plurality of EUs through a RN. Accordingly, the RN receives signals from both the CO and the EUs. The received signals generally include at least a data signal sent from an EU and a pilot signal sent from the CO. The RN is also equipped with apparatus which includes a mixing device that mixes the received signals at the RN to create combined signals. The combined signals are then transmitted to the CO. In the CO, the state of the communication system is determined based on the combined signals.

If the combined signals include only data signals from the EUs, a determination can be made that the transmission path of the pilot signal or the mixing device is inoperative. However, if the combined signals include only the pilot signal, a determination can be made that the transmission path of the data signals from the EUs or the mixing device is inoperative. Similarly, if the combined signals are not received at the CO after transmission of the pilot signals, a determination is made that at least one part of the network, i.e., the transmission path from the CO to the RN, the transmission path from the EUs to the RN or the RN is inoperative. However, if the combined signals are received and include the data signals and the pilot signal and their mixing product, then all transmission paths and active components in the communication system are operative.

Other advantages and features of the invention will become apparent form the detailed description taken in conjunction with the drawings, which present illustrative embodiments of the invention.

BRIEF DESCRIPTION OF THE DRAWINGS

The invention will be described with reference to the following drawings in which like reference numerals refer to like elements and wherein.

DETAILED DESCRIPTION OF EMBODIMENTS

Figure 1:
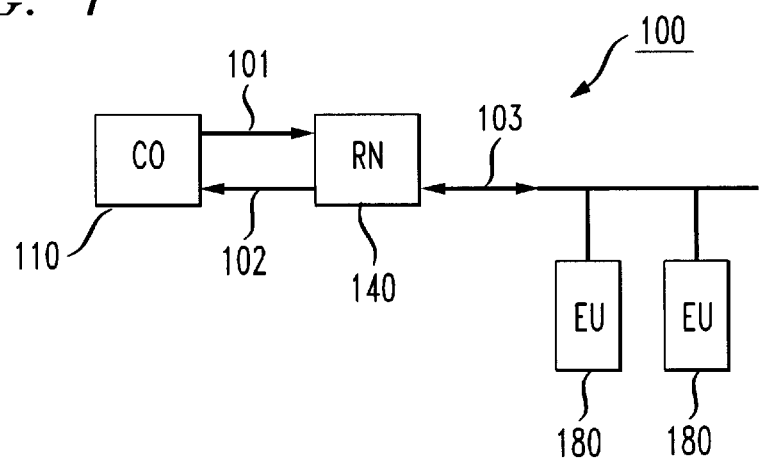
FIG. 1 is a block diagram showing a network architecture implementing the invention.

As shown in FIG. 1, a bi-directional communication system 100 will be described. The communication system 100 transmits and analyzes monitoring signals according to a first illustrative embodiment of the invention.

As shown in FIG. 1, central office (CO) 110 is coupled through trunk lines 101, 102 to a remote signal distribution unit, referred to as remote node (RN) 140. The trunk lines 101, 102 can be coaxial cable, fiber optic cable, twisted wire pair or radio link. Alternatively, the trunk lines 101, 102 can be a single bi-directional trunk line. The RN 140 outputs communication signals received from the CO 110 over trunk line 101 to a plurality of end units (EUs) 180 using distribution path 103. The distribution path 103 can also be coaxial cable, fiber optic cable, twisted wire pair, radio link or the like. The EUs 180 can transmit return communication signals to the CO 110 via the RN 140 and the trunk line 102.

In general, the signals transmitted from the CO to the EUs are called downstream signals, and the signals transmitted from the EUs to the CO are called upstream signals. As shown in FIG. 1, the CO 110 transmits to a single RN 140. As understood by persons skilled in the art, the CO 110 can transmit over a plurality of trunk lines 101 or trunk line pairs 101, 102. Further, a plurality of RNs 140 can connect to a single trunk or trunk line pair. Similarly, a plurality of distribution paths 103 connecting at least one EU 180 can be served by a single RN 140. Thus, the plurality of EUs 180 shown in FIG. 1 can be a subset of the EUs connected to the CO 110.

For monitoring purposes, CO 110 sends a pilot signal downstream over trunk line 101 to the RN 140. A return signal destined for the CO 110 is sent from each EU 180 upstream over the distribution path 103 to the RN 140. The pilot signal received by the RN 140 is combined with the return signal from at least one EU 180 to generate combined signals that can be analyzed to determine a state of the communication system 100. The pilot signal and the return signal can be combined using a monitoring device (not shown), by mixing, or other suitable means to generate the combined signals.

Preferably the return signals are data signals transmitted from the EUs 180 to the CO 110 via the RN 140. Thus, the upstream return data signals from the EUs 180 to the RN 140 can serve at least the dual functions of upstream data signals and network status monitoring signals.

In the first illustrative embodiment, the combined signals are transmitted from the RN 140 over the trunk line 102 to the CO 110 for analysis. Thus, the monitoring function that determines the state of the communication system 100 is performed at the CO 110. Alternatively, the combined signals could be analyzed at the RN 140. In this case, the RN 140 transmits the monitoring results to the CO 110.

In the first illustrative embodiment in which the CO 110 performs the monitoring function, one example of analyzing the combined signals to determine the state of the communication system 100 is as follows. If the combined signals are not received by the CO 110 after transmission of the pilot signal, then a determination is made that any part of the transmission (communication) path could be inoperative. If the combined signals are received and include only the return signals from the EUs 180, then a determination is made that the trunk line 101 from the CO 110 to the RN 140 or the mixing device (not shown) that mixes the pilot signal and the return signals to form the combined signals is inoperative. If the combined signals are received and include only the pilot signal, then a determination is made that the distribution path 103 between the EU 180 and the RN 140 or the mixing device (not shown) is inoperative. If the combined signals include the return data signals and the pilot signal and their mixing product, then a determination is made that all communication paths are operative. Thus, in the first illustrative embodiment, the pilot signal and upstream return signals from the EU 180 to the RN 140 are combined at the RN 140 and transmitted to the CO 110 where the network monitoring function is performed. Further, the integrity of the transmission paths and the remote active components in the communication system are monitored at one location.

Figure 2:
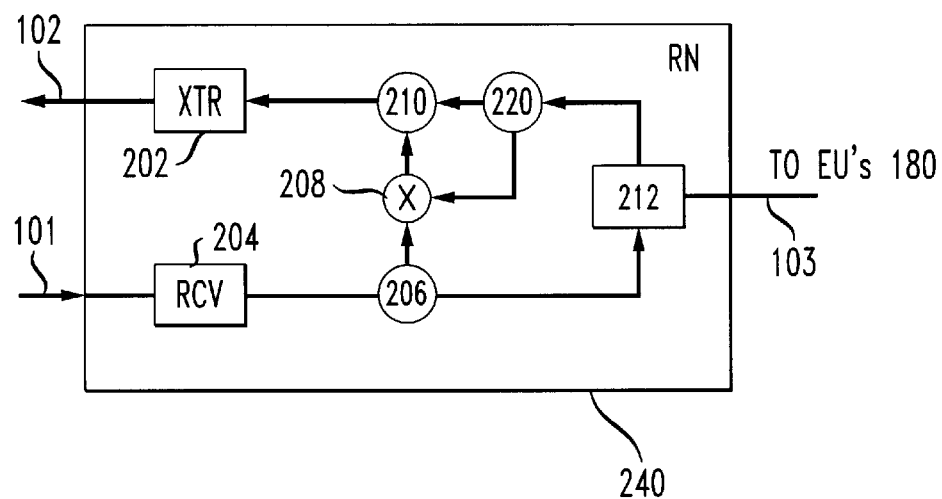
FIG. 2 is a block diagram illustrating an RN module according to the network of FIG. 1.

FIG. 2 shows details of certain aspects of the communication system 100 of the invention. In FIG. 2, the trunk lines 101 and 102 are optical fibers and the distribution path 103 is a coaxial cable. The RN 240 can transmit signals to and receive signals from the CO 110 over the trunk lines 101, 102. The RN 240 can transmit signals to and receive signals from the EUs 180 over the distribution path 103. The RN 240 includes a receiver 204 connected to a diplexer 212 through a coupler 206. RN 240 further includes a transmitter 202 connected to the diplexer 212 through couplers 210 and 220. Further, a mixer 208 is connected between the couplers 206, 210 and 220.

The receiver 204 receives downstream optical signals from the CO 110 through the optical fiber 101 and converts the optical signals into electrical signals that are input into the diplexer 212 via the coupler 206. At least part of the downstream signals can also be directed to the mixer 208 by the coupler 206. The diplexer 212 outputs the downstream electrical signals directly to the distribution path 103. The diplexer 212 receives upstream signals directly from the distribution path 103 and outputs the upstream signals to the transmitter 202 via the couplers 220 and 210. Further, the coupler 220 can direct at least part of the upstream return signals to the transmitter 202 via the mixer 208 and the coupler 210. The transmitter 202 converts the electrical signals into optical signals and outputs the upstream optical signals to the CO 110 through the optical fiber 102.

The trunk line can include one or more optical fibers. If one optical fiber is used, both downstream and upstream communication use the same optical fiber. As shown in FIG. 2, if two optical fibers are included, one optical fiber (i.e., the optical fiber 101) can be dedicated to downstream communication and the other optical fiber (i.e., optical fiber 102) can be dedicated to upstream communication.

For monitoring purposes, the CO 110 sends a pilot signal downstream using the optical fiber 101 to the RN 240. The receiver 204 in the RN 240 receives the pilot signal from the CO 110. The pilot signal is directed by the coupler 206 to the mixer 208. A return signal sent from at least one EU 180 over the coaxial cable 103 to the diplexer 212 is directed by the coupler 220 to the mixer 208. The mixer 208 combines the pilot signal and the return signals to generate combined signals that can be analyzed to determine a state of the communication system 100. The combined signals are sent to the transmitter 202 via the coupler 210.

Alternatively, the pilot signal could be transmitted via the diplexer 212 and the coaxial cable 103 to the EUs 180. In this case, in response to receiving the pilot signal, at least one EU 180 transmits a pilot return signal over the coaxial cable 103, the diplexer 212 and to the coupler 220. In this case, the coupler 220 directs the return pilot signal to the mixer 208. The mixer 208 generates the combined signals used to analyze the status of communication system 100. Preferably, the EUs 180 transmit data signals instead of a return pilot signal in response to receiving the pilot signal.

In the above example, the redirection of the return signals to the mixer 208 is performed by the coupler 220. However, the disclosed signal routing in the communication system is not intended to be limiting. For example, the return signals could be redirected to the mixer 208 from other locations such as from the coaxial cable 103 between the EUs 180 and the diplexer 212. In addition, upstream signals can be frequency converted in the RN 240 to a frequency having greater noise tolerance. For example, the lower frequency upstream signals can be upconverted by the mixer 208. Alternatively, the lower frequency upstream signals can be upconverted before receipt by the mixer 208.

The combined monitor signals are then transmitted by transmitter 202 over the optical fiber 102 to the CO 110 for analysis. As in the first illustrative embodiment, the combined signals could be analyzed at the RN 240. In this case, the results of the monitoring of communication system 100 are transmitted by the transmitter 202 to the CO 110.

In the CO 110, the combined signals are analyzed to determine the state of the communication system 100 as follows. If no signals are received by the CO 110 after transmission of the pilot signals except the signal (which may be a light signal) from transmitter 202, then a determination is made that at least the transmission (communication) path 101 is inoperative. If no signal is received by the CO 110, then the path 102 or XTR 202 is definitely inoperative. If the combined signals are received and only include the return data signals from the EUs 180, then a determination is made that a transmission path from the CO 110 to the receiver 204 in the RN 240 or the mixer 208 is inoperative. If the combined signals are received and include only the pilot signal, then a determination is made that a transmission path between the EUs 180 and the RN 240 or the mixer 208 is inoperative. If the combined signals include the return data signals and the pilot signal and their mixing product, then a determination is made that all communication paths are operative.

Further, as understood by persons skilled in the art, the mixer 208 can mix or combine the pilot signal and the return signals using a different combining scheme. In the RN 240, the mixer 208 uses a frequency conversion scheme to generate the combined signals. Alternatively, the combining scheme could include a time division multiplexing scheme, a code mixing scheme, a wavelength conversion scheme or other suitable techniques.

In addition, if the communication system 100 includes one additional transmission path (not shown) downstream from the CO 110 to the RN 240, the CO 110 can send an additional pilot signal to the RN 240 (i.e., the mixer 208) via that additional transmission path (not shown). In this case, the return data signals received by the RN 240 from the EUs 180, the pilot signal and the additional pilot signal are used by the mixer 208 to generate the combined signals. In this case, the status of communication system 100 determined using the combined signals would include the status of the additional downstream transmission path to the RN 240. Further, the combined signals can be analyzed by the RN 240 or transmitted to the CO 110 for analysis. Alternatively, the additional pilot signal could be transmitted to the EUs 180 in addition to the RN 240.

Figure 3:
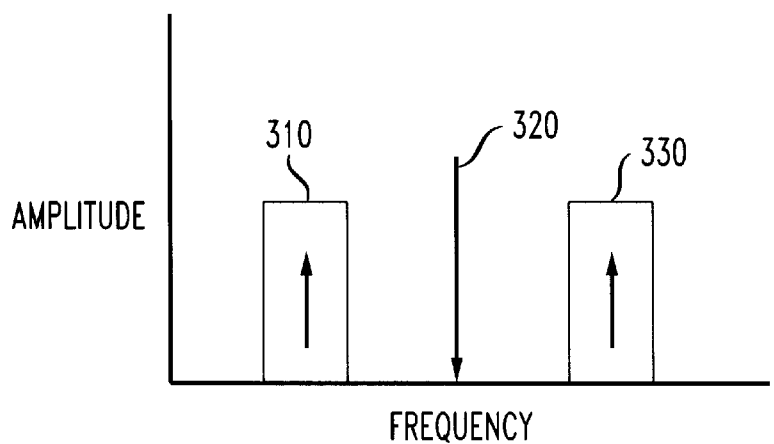
FIG. 3 is graph showing exemplary frequencies for various monitoring signals.

FIG. 3 illustrates an exemplary mixing scheme. The signal 310 represents the return data signals transmitted at a predetermined frequency by an EU 180 to the CO 110 via the RN 240. The signal 320 represents the pilot signal transmitted by the CO 110 to the RN 240 or the pilot signal transmitted to the EUs 180 via the RN 240. As illustrated in FIG. 3, the pilot signal 320 may be a narrowband signal such as a single RF tone. The upconverted signal 330 represents the mixing product of the signals 310 and 320. Thus, for the communication system 100, the combined signals comprise the signals 310, 320, 330. All the signals 310, 320 and 330 can be communicated to the transmitter 202 for transmission to the CO 110.

In the illustrative embodiment of FIG. 2, the pilot signal is transmitted from the CO 110 to the RN 240. Further, the return data signals via the RN 240 are combined with the pilot signal to generate combined signals. Alternatively, only portions of those signals could be used. For example, one part of the pilot signal from the CO 110 received at the RN 240 could be transmitted to the EUs 180 by the RN 240 and another part of the pilot signal could be transmitted to the mixer 208 by the RN 240. Similarly, only one part of the data signals sent by each EU 180 to the CO 110 could be used for the return data signal.

Further, electrical and optical signals could be combined in the implementation of the invention. If the remote node includes a laser transmitter or the like, the CO can monitor both a constant level of the received light from the RN in addition to communication signals (data signals) modulating the constant level of the light. In this case, the monitoring apparatus could further determine the situation where the CO receives the constant light but does not receive the communication signals. If the combined signals are received and only include the constant light but not the communication signals, then a determination is made that the distribution path between the RN and the EU, or the trunk line carrying the pilot signal from the CO is inoperative.

While this invention has been described in conjunction with the specific embodiments outlined above, modifications and variations will be apparent to persons skilled in the art. Various changes may be made without departing from the spirit of the invention, whose scope is intended to be limited only by the following claims.

What is claimed is:

1. A method for monitoring a communication system, comprising:

transmitting a first signal at a first frequency to a destination;

combining a second signal at a second frequency with the first signal at the destination to generate a combined signal, the first and second frequencies being different; and monitoring the combined signal to determine a state of the destination.

2. The method of claim 1, wherein the first signal is transmitted from a central office.

3. The method of claim 2, wherein the first signal is a narrow band tone transmitted from the central office to the destination.

4. The method of claim 2, wherein the combined signal is monitored at a node remote from the central office.

5. The method of claim 1, wherein the first signal is transmitted from an end unit.

6. The method of claim 1, wherein the combined signal is the first signal mixed with the second signal.

7. The method of claim 1, wherein the second signal is a frequency shifted data signal.

8. The method of claim 1, wherein the monitoring comprises determining if a transmission path within the system is inoperative.

9. The method of claim 8, wherein the first transmission path is inoperative if the combined signal includes only the second signal, and the second transmission path is inoperative if the combined signal includes only the first signal.

10. The method of claim 9, wherein the monitoring includes determining that the first and second transmission paths are operative if the combined signal comprises both a portion of the first and the second signals.

11. A communication system comprising:

a first node;

a second node coupled to the first node that receives a pilot signal from the first node;

a mixing device in the second node that mixes the pilot signal and data signals to produce combined signals; and a monitoring device in the second node that monitors the combined signals to determine a state of the communication system between the first and the second nodes.

12. The system of claim 11, wherein the pilot signal comprises a narrow band tone.

13. The system of claim 11, further comprising a transmitting device that transmits the state of the communication system between the first and second nodes back to a central office.

14. The system of claim 11, further comprising a frequency shifting device for frequency shifting the data signals.

15. The system of claim 11, wherein the mixing device performs at least one of: time division multiple access, code division multiple access and wavelength modulation.

16. The system of claim 15, wherein the first path is inoperative if the combined signals include only the data signals, and that a second path is inoperative if the combined signals includes only the pilot signal.

17. The system of claim 16, wherein the monitoring device further determines that no path is inoperative if the combined signals includes a portion of the data signals, the pilot signal and their mixing product.

* * * * *